United States Patent
Bolling

[19]

[11] Patent Number: 6,135,145
[45] Date of Patent: Oct. 24, 2000

[54] VALVE AND FILTRATION ARRANGEMENT FOR POLYMER PROCESSING SYSTEM

[75] Inventor: Michael G. Bolling, Rock Hill, S.C.

[73] Assignee: MAAG Pump Systems Textron Inc., Providence, R.I.

[21] Appl. No.: 09/090,755

[22] Filed: Jun. 4, 1998

Related U.S. Application Data

[60] Provisional application No. 60/048,821, Jun. 6, 1997.

[51] Int. Cl.[7] .................................................. F16K 11/20
[52] U.S. Cl. ...................................... 137/545; 137/599.14
[58] Field of Search ............................... 137/545, 599.1, 137/597, 625.29

[56] References Cited

U.S. PATENT DOCUMENTS

| | | | |
|---|---|---|---|
| 2,471,951 | 5/1949 | Granberg | 137/625.29 X |
| 3,618,781 | 11/1971 | Brown | 137/545 X |
| 3,771,561 | 11/1973 | Santamaria, Jr. | 137/625.48 |
| 3,935,108 | 1/1976 | Forgues | 137/599.1 X |
| 4,334,552 | 6/1982 | Blanchard | 137/625.48 |
| 4,493,476 | 1/1985 | Strickland et al. | 137/625.48 |
| 4,936,348 | 6/1990 | Swanson et al. | 137/625.46 |
| 5,295,510 | 3/1994 | Bolling et al. | 137/625.48 |
| 5,358,329 | 10/1994 | Plache et al. | 366/97 |

OTHER PUBLICATIONS

Brochure entitled Systems—The Leader in Porous Metal Filtration Technolgy; Fluid Dynamics Memtec Group; Bulletin 4001–FD Jun. 1996.

*Primary Examiner*—Stephen M. Hepperle
*Attorney, Agent, or Firm*—Trexler, Bushnell, Giangiorgi & Blackstone, Ltd.

[57] ABSTRACT

An improved polymer processing system having a pair of filtration units and a diverter valve arrangement for directing the flow of molten polymers alternately through the filtration units includes an improved manifold for the diverter valve arrangement for positioning the filtration units at opposite sides of the diverter valve arrangement allowing connection between the diverter valve arrangement and the filtration units with relatively shorter connecting pipes. The improved polymer processing system also includes an improved vent valve arrangement extending through the lid of the filtration unit and a means for introducing gas into an inactive filtration unit for speeding the draining of the polymer from the unit. The improved polymer processing system also includes a means for protecting the annular seal of the inlet port of each filtration unit during the process of reinstalling the filter vessel into the surrounding jacket. In addition, a system support frame is provided for supporting the filtration units in suspension and includes a bolt sealing assembly for sealing the filter vessels with the piping from the diverter valve without placing stress on the jacket surrounding the filter vessel.

27 Claims, 11 Drawing Sheets

FIG. 13
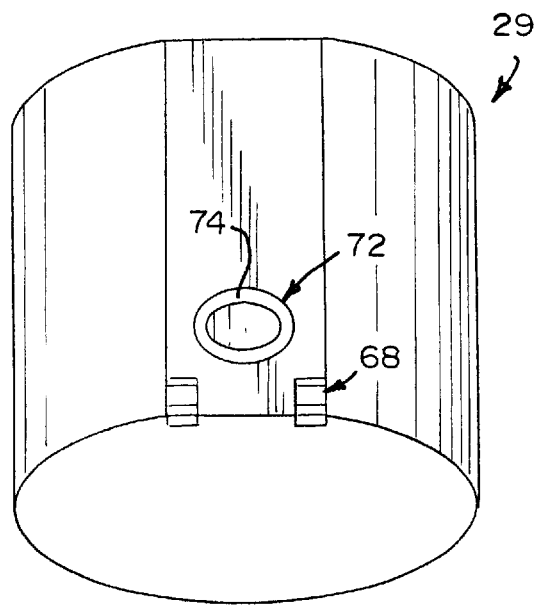
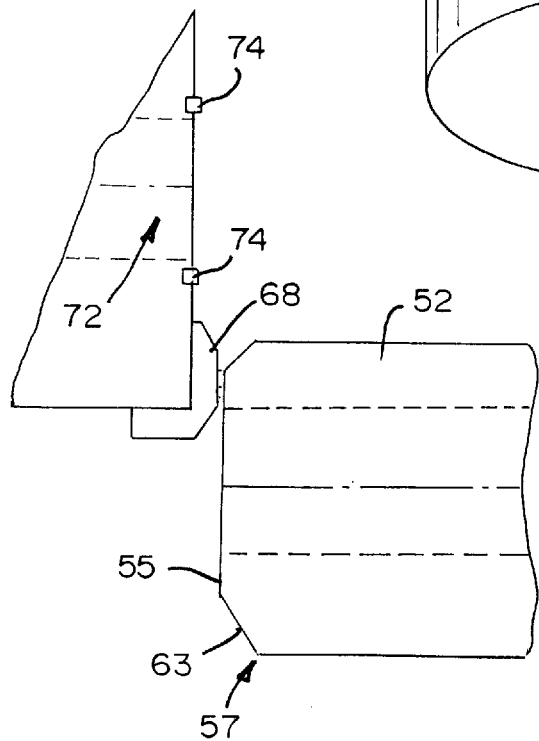
FIG. 14
FIG. 15
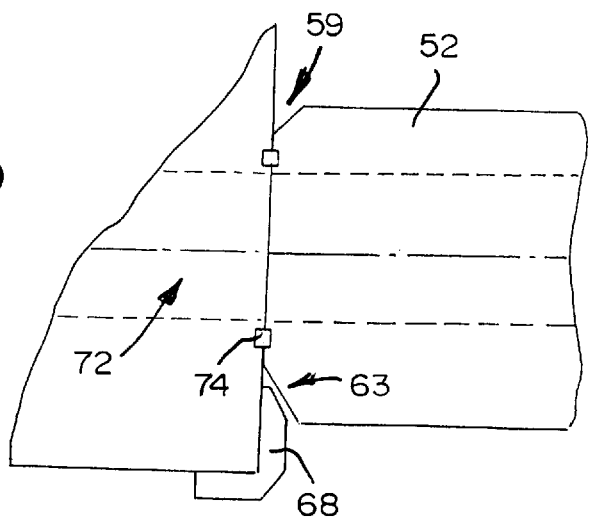

VALVE AND FILTRATION ARRANGEMENT FOR POLYMER PROCESSING SYSTEM

CROSS-REFERENCE TO RELATED APPLICATIONS

This disclosure incorporates and has the priority of the U.S. Provisional Patent Application Serial No. 60/048,821, filed Jun. 6, 1997, entitled VALVE AND FILTRATION ARRANGEMENT FOR POLYMER PROCESSING SYSTEM.

BACKGROUND OF THE INVENTION

The present invention relates generally to the processing of thermoplastic polymers and, more particularly, to an improved filtration and diverter valve arrangement for use in such systems for directing the flow of viscous molten thermoplastic polymers under relatively high pressures.

In many manufacturing operations involving the formation of products from molten thermoplastic material, e.g., plastic extrusion, injection molding, and blow molding operations, it is desirable, if not essential, that the operation be carried out on a continuous flow basis. Additionally, it is common practice in such operations to filter impurities from the thermoplastic material by passage through a suitable filtration unit. Necessarily, such filtration units require periodic cleaning and, accordingly, to accommodate such cleaning and also permit the manufacturing operation to proceed on a continuous basis, dual filtration units are typically utilized with a diverter valve situated in the flow line to selectively direct the fluid material through one of the filters while the other is inactive for periodic cleaning and maintenance and otherwise to serve as a back-up to the operating filter.

Molten thermoplastic polymers often have temperatures in excess of 400° F. and even as high as 600° F. or more and often flow at pressures in excess of 1000 PSI up to 5000 PSI. Importantly, many thermoplastic polymers can be quite sensitive to temperature, such that the residence time of the polymers flowing through the diverter valve and the operative filter must be closely controlled to avoid overheating and possible degradation of the polymer. Thus, such valves must be configured such that the fluid flow characteristics do not differ between the alternate operating dispositions of the valve and, especially, the flow passageways through the valve must be configured to avoid any stagnation in the fluid flow which could cause certain thermoplastic materials to undergo changes in their physical or chemical character. Similarly, it is critical to control operation of the diverter valve and the filters during changeovers from one filter to the other in order to ensure continuous polymer output flow without significantly altering the temperature and characteristics of the polymer.

Thus, the process of changing over a polymer process line from one filter to another by means of the diverter valve is normally carried out gradually by initially diverting only a portion of the polymer flow, e.g., approximately 10%, from the filter in active use which needs cleaning or maintenance while correspondingly increasing the polymer pumping speed to maintain the same volumetric output downstream from such filter. In this manner, the clean, idle filter can be filled with polymer in preparation for the ultimate changeover completely to the idle filter. The filters typically include a vent valve which may be located external to the lid of the filter vessel for bleeding the air and initial flow of polymer incoming into an idle filter preparatory to placement of the filter into operation. In order to maintain heat within the filter and avoid loss of polymer temperature, the external vent valve must be jacketed.

Once the changeover has been fully completed, the filter taken out of service can be disassembled for cleaning and/or maintenance. Such filters are typically contained within an enclosed vessel which itself is supported within a surrounding sleeve or jacket so that heated oil can be circulated about the filter vessel during operation in order to maintain the desired polymer temperature level. As will be understood, the piping from the diverter valve must therefore pass through the outer jacket or sleeve into sealed relation with the filter vessel therewithin in order to prevent leakage of the polymer. For this purpose, the inlet port on the filter vessel typically carries an annular seal which presses against the end of the piping extending into the sleeve or jacket when the filter vessel is installed properly within the jacket. Since such seals are quite fragile, considerable care must be taken when reinstalling a cleaned or repaired filter vessel into the sleeve in order to prevent damage to the seal from contact with the piping.

In order to press the annular seal of the filter vessel into sealed relation with the piping from the diverter valve, the sleeve or jacket surrounding the filter vessel typically includes two bolt assemblies, each including a bolt housing having an opening situated on the opposite side of the filter vessel from the inlet port for receiving the bolt. Once the filter vessel is properly installed into the sleeve or jacket, the bolt, operating through the opening, is adapted to press directly against the filter vessel in the direction of the diverter valve to push the annular seal of the inlet port into sealing engagement with the piping. When the filter is idle, the bolts are loosened and retracted and the out of service filter vessel can be removed and disassembled for cleaning and/or maintenance.

Ideally, the piping extending from the diverter valve to the two filters should be as short in length as possible, which facilitates cleaning. Two examples of conventional diverter valves used in polymer processing systems of the type described above are described in Blanchard U.S. Pat. No. 4,334,552 and Bolling et al U.S. Pat. No. 5,295,510. In the diverter valves of both patents, polymer enters the diverter valve through a lateral port in a valve manifold and exits the diverter valve through two alternative outlet ports disposed generally at the same outwardly facing side of the manifold once of the disadvantages of such arrangement is that the relatively close adjacent disposition of the two outlet ports necessitates placement of the two filter vessels at the same side of the diverter valve which, in turn, necessitates that the piping connecting the diverter valve ports respectively to the filters must be sufficiently long to permit the filters to be spaced from one another.

SUMMARY OF THE INVENTION

It is accordingly an object of the present invention to improve conventional polymer processing systems by providing various improvements in the conventional diverter valve and filtration arrangement utilized in such systems.

More particularly, one object of the present invention is to provide an improved manifold for a diverter valve by which the two diverting ports from the diverter valve utilized to carry polymer to or from the filters are located at opposite sides of the manifold whereby the filters can be respectively located at opposites sides of the diverter valve with the connecting pipes between the valve outlet ports being enabled to be relatively shortened in comparison to the conventional diverter valves discussed above.

Another specific object of the present invention is to provide an improved vent valve arrangement for use with the filters in such polymer processing systems for bleeding the air and initial flow of polymer incoming into an idle filter preparatory to placement of the filter into operation. In particular, in comparison to conventional vent valves which are located externally to the lid of the filter vessel and therefore must be jacketed for heat maintenance purposes, the improved vent valve of the present invention extends through the lid of the filter vessel so as to be heated by the surrounding oil without special jacketing of the valve.

Another object of the present invention is to provide means for speeding the draining of the polymer from the filter vessel no longer in use. Specifically, this aspect of the invention contemplates the provision of gas purge ports in the diverter valve which are only in alignment with each other for use when the filter vessel served by that side of the diverter valve is off-stream or not in use. This allows the introduction of an inert gas, such as nitrogen, into the off-stream filter vessel which may be useful to speed the draining of the polymer from the off-stream filter vessel.

A further object of the present invention is to provide a means for protecting the annular seal on the filter vessel which mates with the piping during the process of reinstalling a filter into the surrounding jacket or sleeve after cleaning or maintenance of the filter. Basically, this aspect of the invention contemplates the provision of protector lugs projecting outwardly from the end face of the piping at a spacing greater than the diameter of the seal and adapted to mate in corresponding notches or recesses in the outer surface of the filter vessel adjacent the seal therein. Upon any contact between the filter vessel and the end of the piping during installation of the filter vessel into its surrounding jacket, the protector lugs will maintain a sufficient separation between the vessel and the piping to prevent contact with the seal until the vessel is properly positioned to allow the lugs to seat in the mating recesses, whereupon the seal simultaneously seats properly with the end face of the piping. Alternately, the protector lugs can be installed on and project outwardly from the filter vessel and the end face of the piping includes notches or chamfers adapted to mate in an adjacent engagement with the protector lugs. Upon any contact between the filter vessel and the end of the piping during installation, the protector lugs will maintain a sufficient separation between the vessel and the piping to prevent contact with the seal until the vessel is properly positioned so that the lugs are seated adjacent to notches or chamfers of the piping, whereupon the seal simultaneously seats properly with the end face of the piping and the seal and mating surfaces are protected.

Yet another object of the present invention is to provide a system support frame for supporting the filter vessels in suspension which includes a bolt sealing assembly for sealing the filter vessels with the piping from the diverter valve without placing pressure on the filter vessel heat exchanger or jacket and thereby avoiding placing stress on the jacket.

BRIEF DESCRIPTION OF THE DRAWINGS

FIG. 13 is a perspective view showing an alternate means of protecting the seal on the filter vessel and depicting a filter vessel with seal protector lugs mounted on the vessel for use in mated sealing engagement with a pipe spool in the polymer processing system of FIGS. 3, 4 and 5;

FIGS. 14 and 15 depict in sequence the installation of the filter vessel of FIG. 13 into sealing engagement with a pipe spool including notches or chamfers on its end face;

DESCRIPTION OF THE PREFERRED EMBODIMENT

Figure 1:
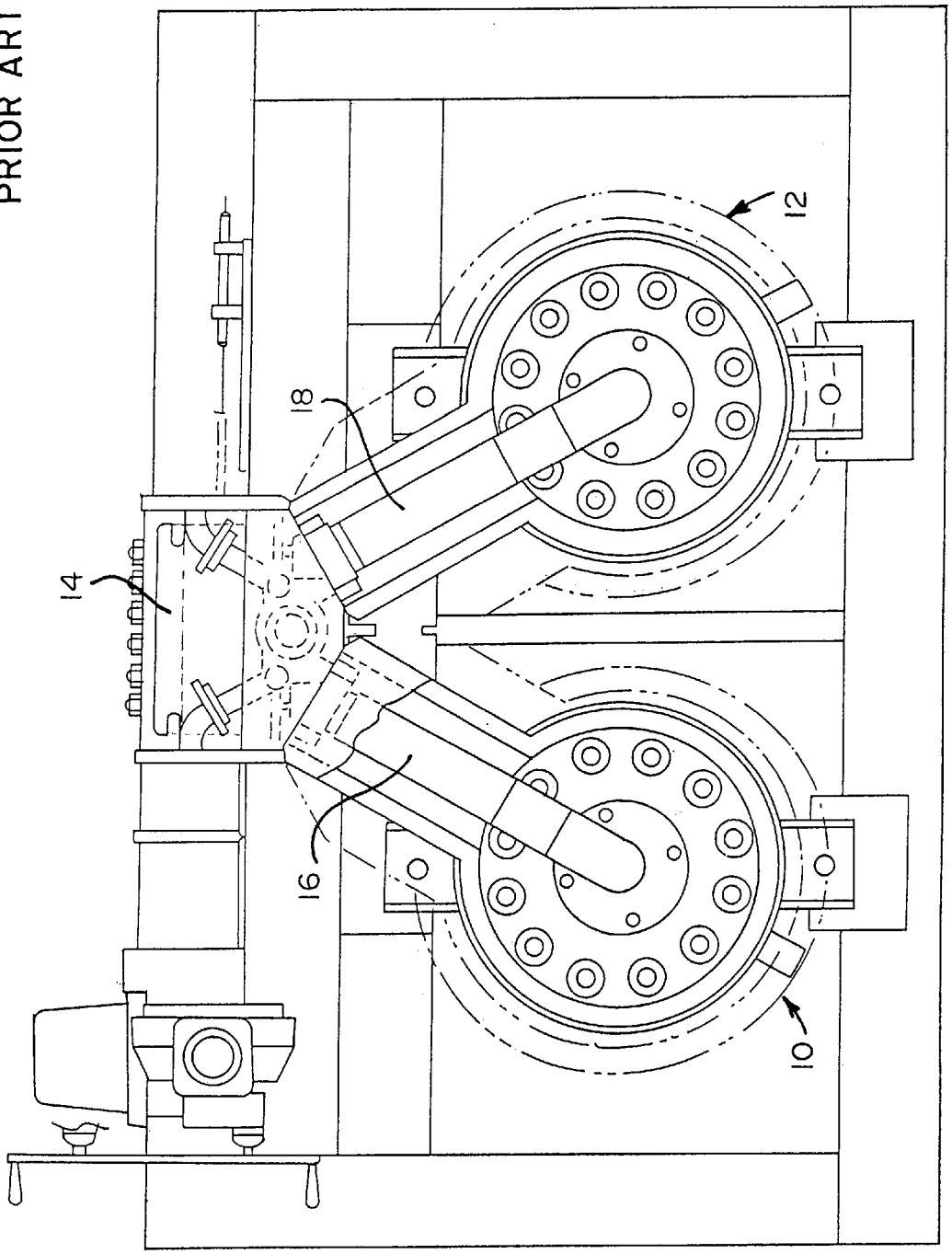
FIG. 1 (PRIOR ART) is a top plan view of a prior art polymer processing system utilizing a diverter valve of the type of abovementioned U.S. Pat. No. 5,295,510.

Referring now to the accompanying drawings and initially to FIG. 1, a conventional polymer processing system is depicted wherein two polymer filtration units 10,12, each of the type having a filter vessel supported internally within a surrounding sleeve or jacket for hot oil flow therethrough; are coupled to a diverter valve assembly 14, at both the inlet and the outlet of the processing system, by which molten polymer delivered into the valve assembly 14 is selectively diverted through connecting pipe spools 16,18, respectively, alternatively into and through the filtration units 10,12. The diverter valve assembly 14 in this polymer processing system is substantially of the construction and operation disclosed in Boiling et al U.S. Pat. No. 5,295,510, identified above. As will be seen, the pipe spools 16,18 extend angularly from the diverter valve assembly 14 in relatively close adjacency from essentially the same side of the diverter valve assembly, whereby the pipe spools 16,18 must be of sufficient length to position the filtration units 10,12 at a spacing from one another.

Figure 2:
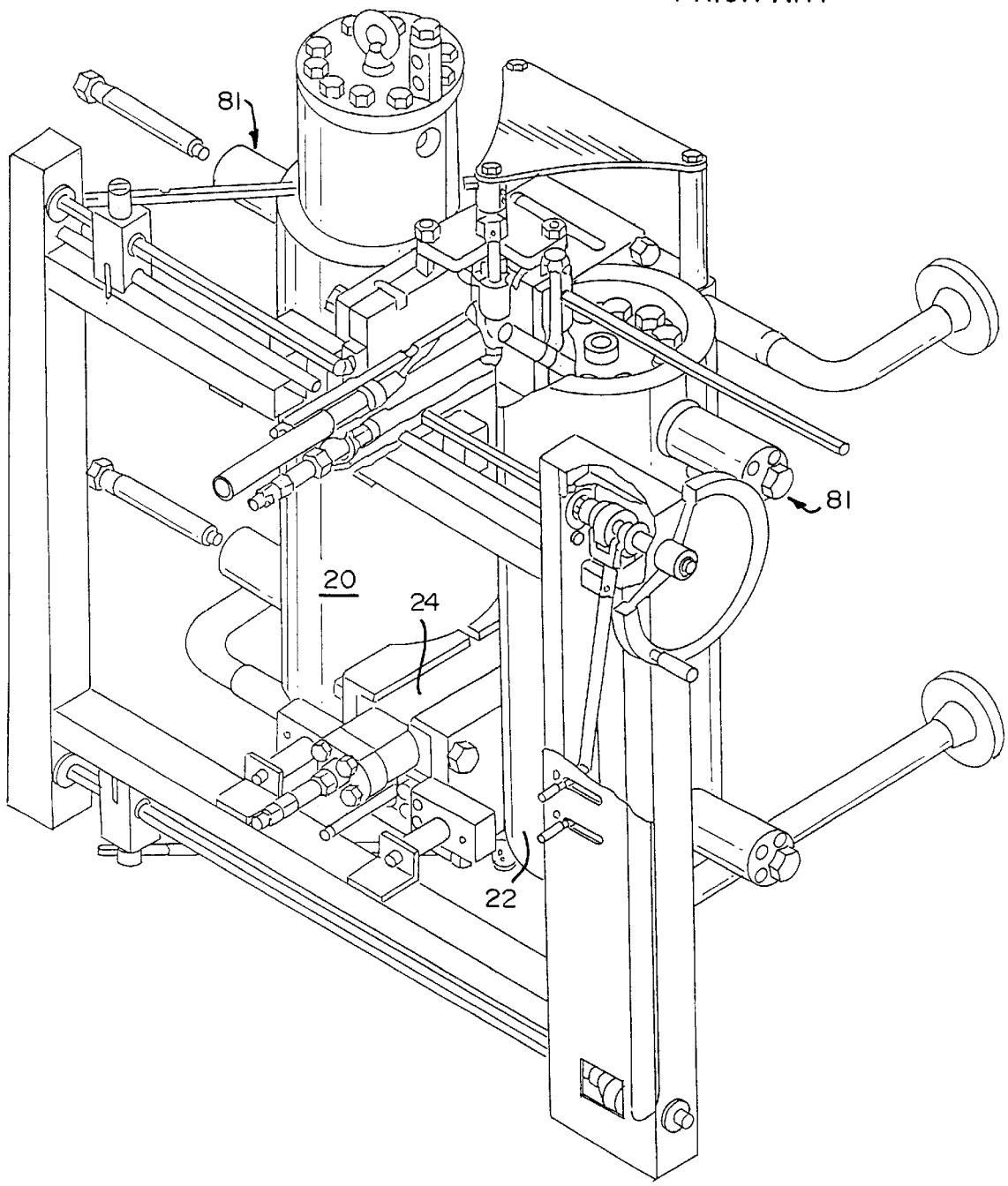
FIG. 2 (PRIOR ART) is a perspective view of another prior art polymer processing system.

FIG. 2 depicts another form of conventional polymer processing system of the type manufactured by Barmag Barmer Maschinenfabrik GmbH of Germany, which similarly utilizes two polymer filtration units 20, 22 coupled by means of another form of diverter valve 24 for alternative filtering operation.

Figure 3:
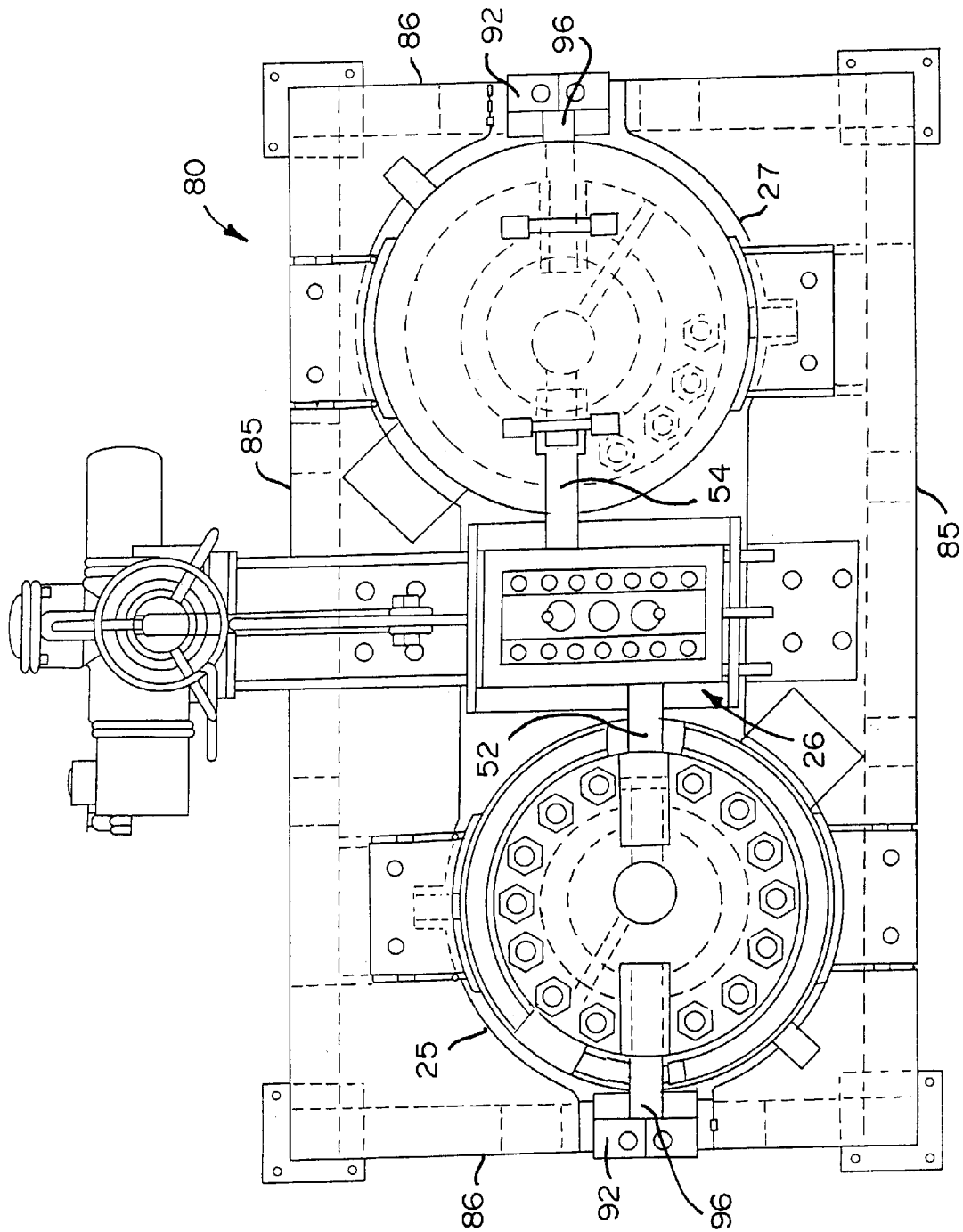
FIG. 3 is a top plan view of a polymer processing system incorporating the improved valve and filtration arrangement of the present invention.
Figure 4:
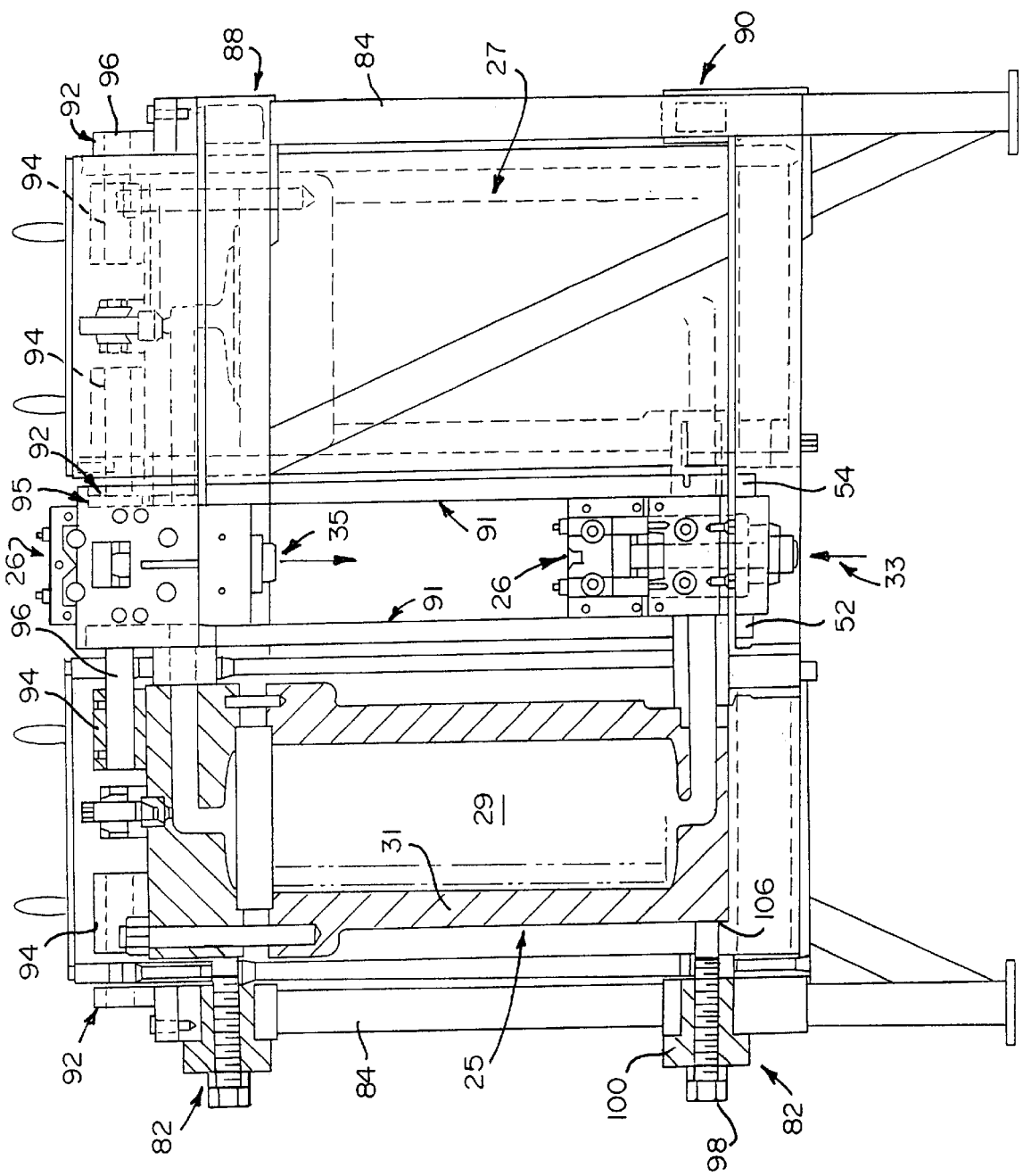
FIG. 4 is an end elevational view of the polymer processing system of FIG. 3.
Figure 5:
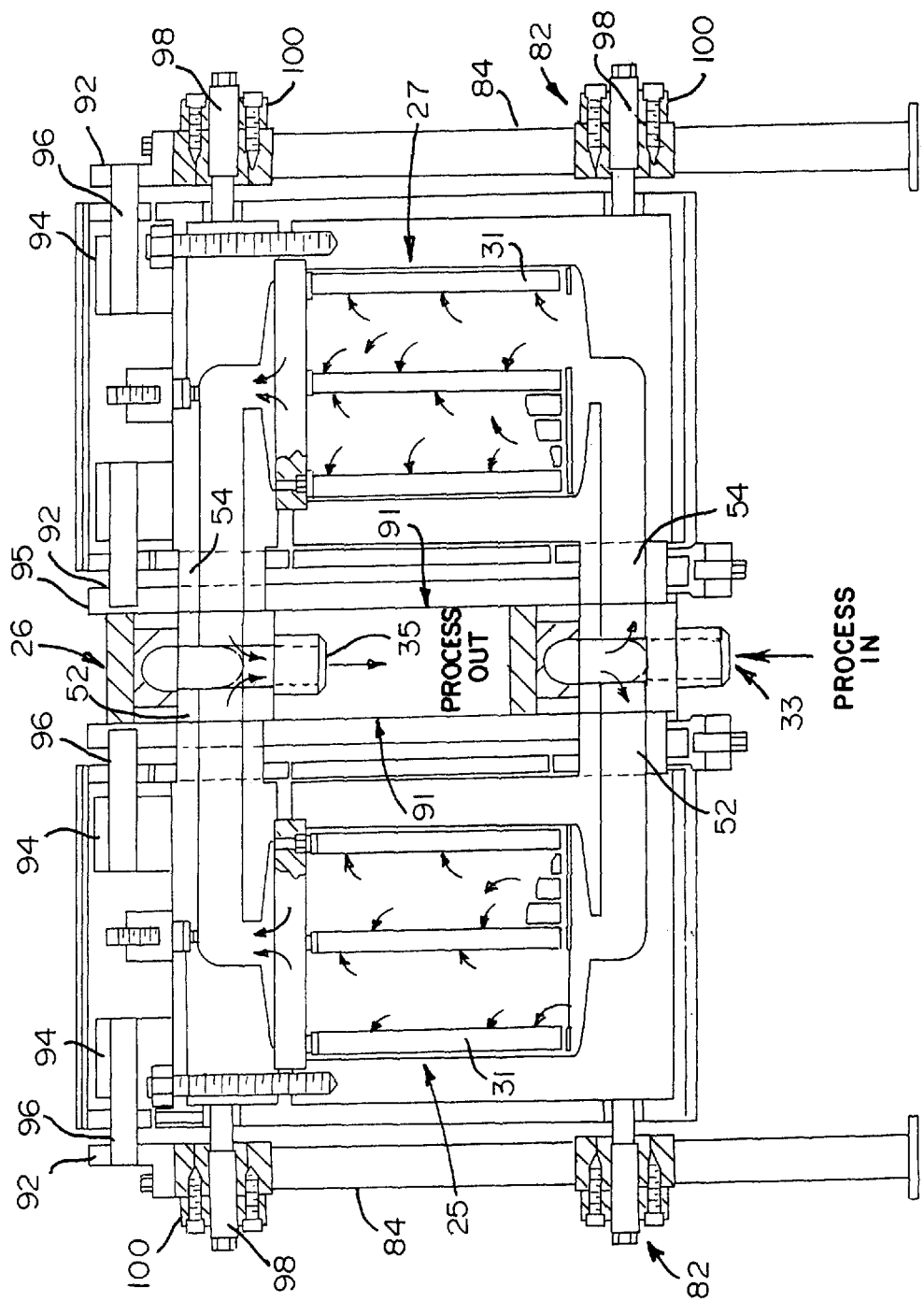
FIG. 5 is an end elevational view of the polymer processing system showing the fluid passages of the polymer processing system of FIGS. 3 and 4.
Figure 7:
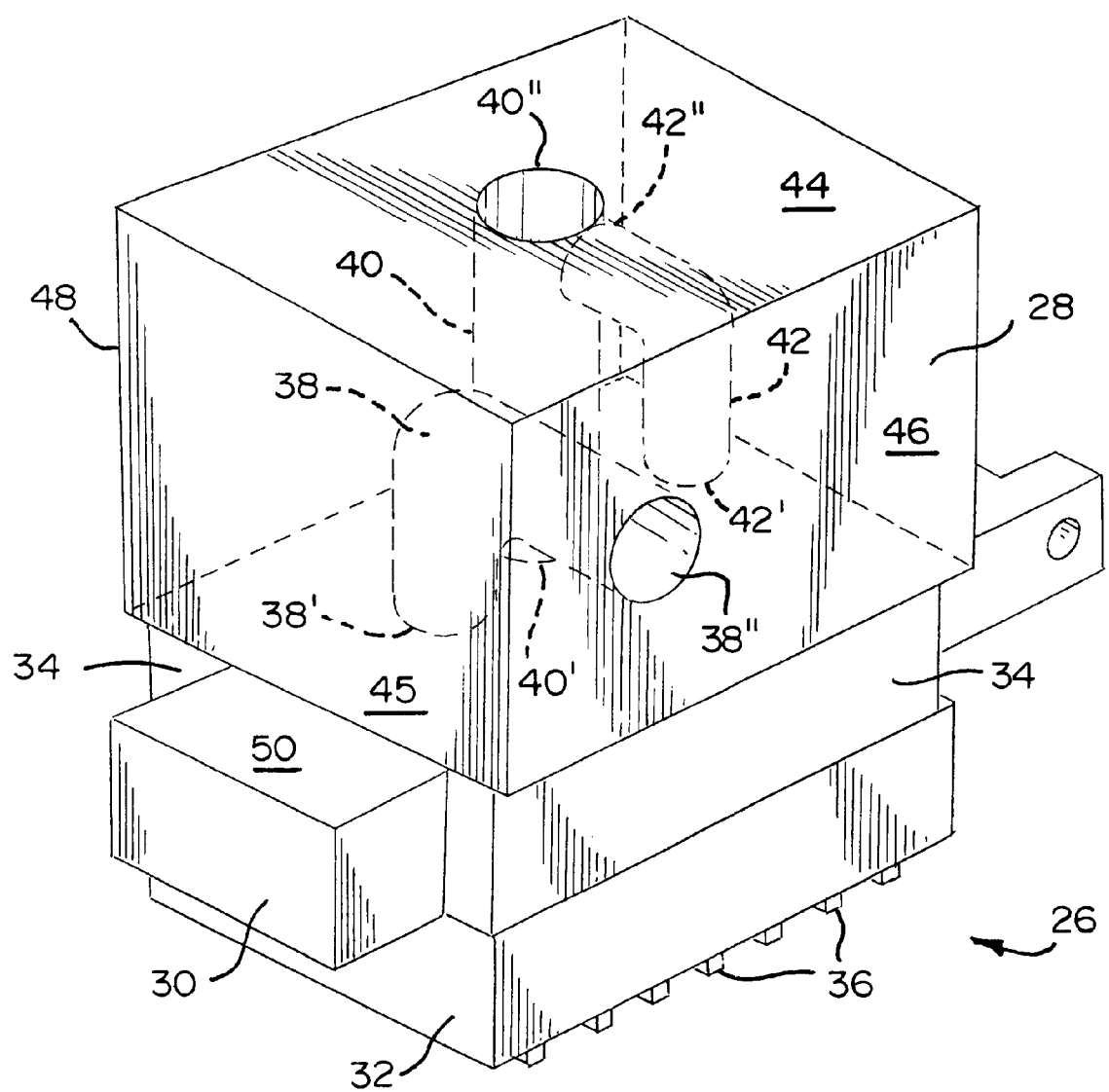
FIG. 7 is a perspective view of the improved diverter valve of the present invention utilized in the polymer processing system of FIGS. 3, 4 and 5.

In contrast, FIGS. 3, 4 and 5 depict an improved polymer processing system in accordance with the present invention including two polymer filtration units 25,27, each having a filter vessel 29 within a surrounding sleeve or jacket 31 which serves as the filter vessel heat exchanger and utilizing an improved diverter valve, at both the inlet 33 and the outlet 35 of the polymer processing system, and shown separately in FIG. 7 at 26. As best seen in FIG. 7, the diverter valve 26 basically comprises a manifold block 28 for receiving incoming fluid flow and discharging outgoing fluid flow through passageways therein as described hereinafter, a slide plate 30 which serves as a movable valve member for controlling communication between the passageways of the manifold block 28, a backing plate 32 disposed opposite the slide plate 30 from the manifold block 28 sandwiching the slide plate therebetween, a pair of side rails 34 disposed along opposite longitudinal sides of the slide plate 30 between the manifold block 28 and the backing plate 32, and a series of bolts 36 extending through the backing plate 32 and the side rails 34 into the manifold block 28 to clamp the backing plate 32 to the manifold block 28 to urge the slide plate 30 into sealed relationship with the manifold block 28.

The fluid flow passages and flow through the filtration units 25,27 of the improved polymer processing system are illustrated in FIG. 5. The construction, operation, and function of the diverter valve 26 and its individual components is substantially the same as that disclosed in Bolling et al U.S. Pat. No. 5,295,510, except in the configuration and arrangement of passageways within the manifold block 28. Specifically, the manifold block 28 is formed from a solid metallic block of a parallelepiped shape, one flat elongated, longitudinal inward surface of which forms a sealing face 45 disposed in sealing surface contact with the slide plate 14. The manifold block 28 includes an outward face 44 parallel to the sealing face 45, and opposite side faces 46,48. A series of three passageways 38,40,42 are formed through the manifold block 28, the passageways opening at the sealing face through respective ports 38',40',42' spaced equidistantly along the length of the sealing face 45. The central passageway 40 extends linearly from its port 40' at the sealing face 45 through the manifold block 28 to the opposite parallel outward face 44 through another port 40". Each end passageway 38,42 extends angularly from its respective port 38',42' outwardly to open at respective opposite side faces 46,48 of the manifold block 28 through respective ports 38",42".

The slide plate 30 is an elongate metal block of parallelepiped shaped having parallel upper and lower faces, with the upper face 50 in sealing surface engagement with the lower sealing face of the manifold block 28. The sealing face 50 of the slide plate 30 is formed with a fluid flow passageway defined by an elongate lengthwise-extending recess 33 of a longitudinal dimension corresponding to the lengthwise dimension between diametrically opposite points on the ports 38',40' (which, as will be noted, is identical in dimension to the corresponding spacing between the ports 40',42'), of widthwise dimension corresponding to the diameters of the ports 38',40',42', and arcuately shaped at its ends in correspondence to the circumference of the ports 38',40',42'. In this manner, the recess is configured to form a passageway precisely bridging the ports 38',40' or the ports 40',42' when the slide plate 30 is slidably positioned to locate the recess over either such pair of ports, thereby representing the two limit positions of the slide plate 30, for pressurized fluid flow between the ports.

Figure 16:
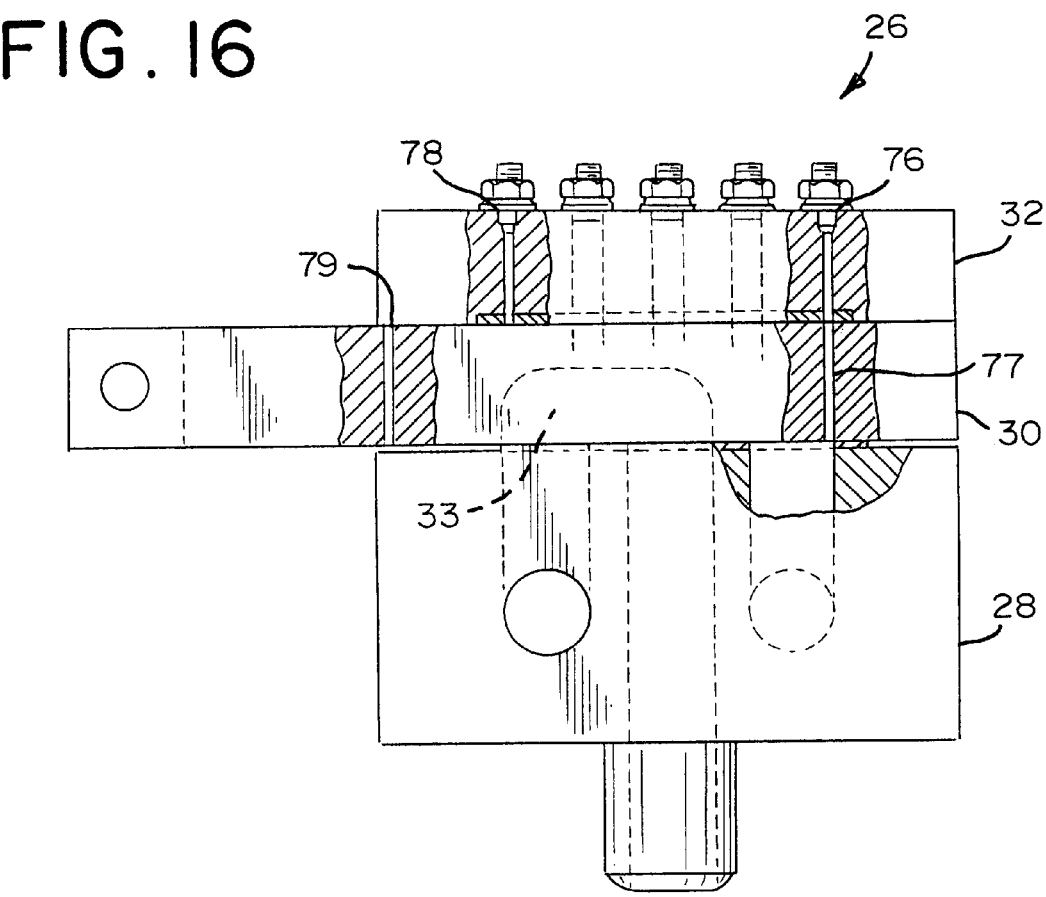
FIG. 16 is a side view of the improved diverter valve, partially broken away, depicting the gas purge ports with one of the gas purge ports in the aligned position.
Figure 17:
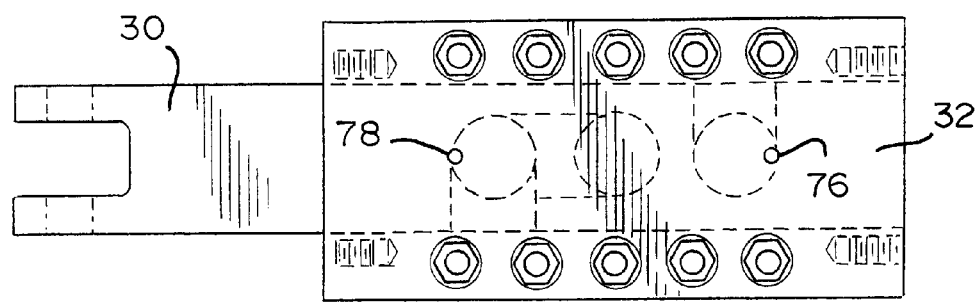
FIG. 17 is a top plan view of the diverter valve showing the gas purge ports of FIG. 16.

The preferred embodiment of the diverter valve 26 also includes means for speeding the draining of fluid from the inactive or off-stream filter vessel which automatically positions itself for communication with the filter vessel only when the filter vessel is off stream. In the preferred embodiment, the means includes first and second channels extending through the backing plate 32 and sliding plate 30 respectively, with the second channels being alternately movable via the movement of the slide plate 30 into vertical alignment with the first channels. As depicted in FIGS. 16 and 17, the first channels are defined by a pair of spaced-apart upper gas purge ports 76,78 extending through the backing plate 32 and the second channels are defined by a pair of lower gas purge ports 77,79 extending through the slide plate 30. The upper and lower gas purge ports are positioned to be alternately placed into vertical alignment with each other so that upper gas purge port 76 and lower gas purge port 77 are aligned (as shown in FIG. 14) or upper gas purge port 78 and lower gas purge port 79 are aligned to provide communication with the inactive filter vessel through the backing plate and sliding plate. In use, as the slide plate 30 is slidably positioned to locate the recess of either pair of ports 38',40' or 40',42' (as shown in FIG. 7), each of the lower gas purge ports 77,79 is alternately placed in communication with one pair of the ports 38',40' or 40',42'. When one set of the upper and lower gas purge ports are in alignment, inert gas, such as by way of example, nitrogen, may be introduced into the inactive filter vessel to speed draining of the polymer. It is a feature that the upper gas ports 76,78 and the lower gas purge ports 77,79 are specifically configured to vertically align with each other only when the filter vessel to be served by the pair of ports which is in communication with the lower gas purge port is off-stream or inactive.

By virtue of the opposed angular orientation of the passageways 38,42 whereby the respective outlet ports 38", 42" of the passageways open at the opposite side faces of the manifold block 28, the diverter valve 26 enables a polymer processing system to be arranged with two filtration units 25,27 disposed at opposite sides of each diverter valve assembly 26 by connection of the filtration units 25,27 through relatively short connecting pipes or pipe spools 52,54 connected with the opposed outlet ports 38",42", as depicted in FIGS. 3, 4 and 5. As best seen in FIGS. 4 and 5, the filtration units 25,27 each include the filter vessel 29 within the filter vessel heat exchanger defined by the surrounding sleeve or jacket 31. As will be recognized by a comparison of the polymer processing system of FIGS. 3, 4 and 5 with the conventional polymer processing system of FIG. 1, this arrangement accomplished by use of the diverter valve 26 is more compact and allows the length of the pipe spools 52, 54 to be minimized to provide enhanced fluid flow characteristics.

Figure 8:
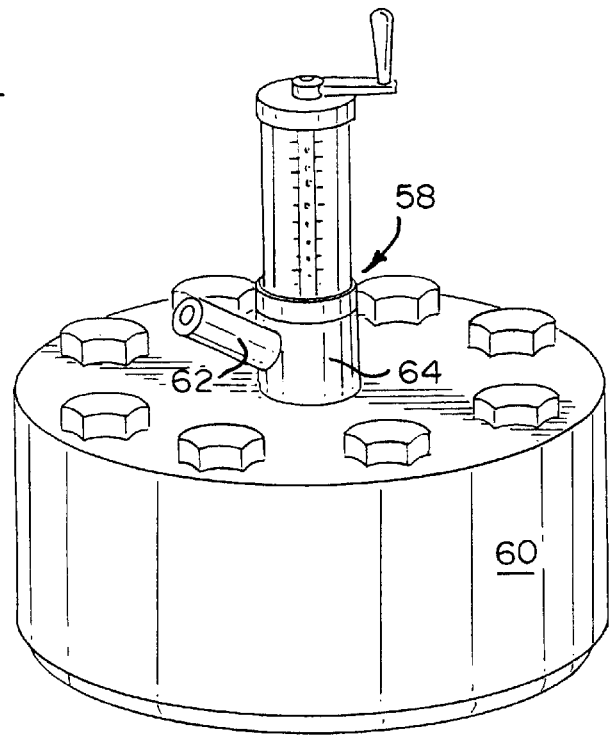
FIG. 8 (PRIOR ART) is a perspective view of one conventional vent valve arrangement such as utilized in the filter vessels of FIG. 1.
Figure 9:
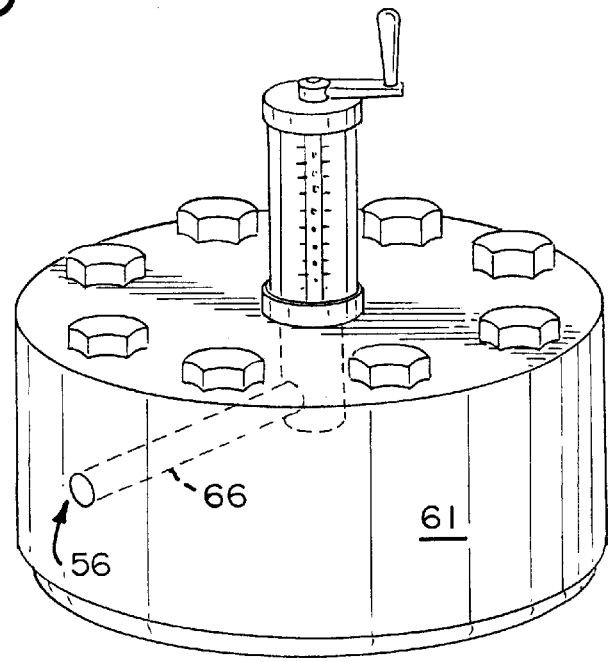
FIG. 9 is a perspective view, similar to FIG. 8, showing the improved vent valve arrangement of the present invention as utilized in the polymer processing system of FIGS. 3 ,4 and 5.

Referring now to FIGS. 8 and 9, another aspect of the present invention residing in an improved vent valve arrangement is shown generally at 56 in FIG. 9, and is to be contrasted with a conventional vent valve arrangement shown in FIG. 8. FIGS. 8 and 9 depict the top lid of a typical filter vessel such as utilized in the present polymer processing system of FIGS. 3, 4 and 5 (or the prior art polymer processing systems of FIGS. 1 and 2). In one conventional form of filter lid shown in FIG. 8, a vent valve arrangement 58 is disposed centrally in the vessel lid 60, with a bleed port 62 projecting angularly outwardly from a central valve hub 64. To maintain temperature in polymer being bled from the vessel through the vent valve arrangement 58, both the valve hub 64 and bleed port 62 are jacketed, which adds to the expense of the vent valve 58. In contrast, the vent valve arrangement 56 of the present invention as shown in FIG. 9, comprises a port 66 extending laterally outwardly through the body of the vessel lid 61, whereby polymer flowing through the port 66 to be bled from the filter vessel will inherently maintain its temperature without special jacketing.

Figure 10:
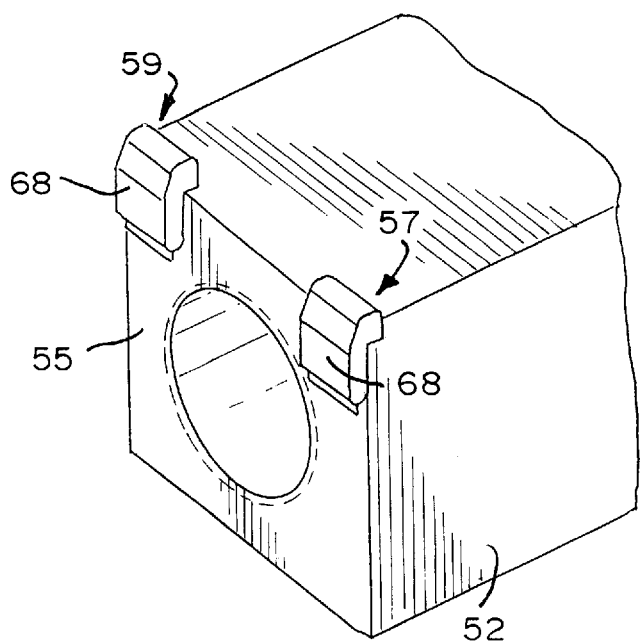
FIG. 10 is a perspective view depicting a pipe spool having seal protector lugs on its end face in accordance with the present invention, for use in mated sealing engagement with the inlet port and seal on a filter vessel in the polymer processing system of FIGS. 3, 4 and 5.
Figure 11:
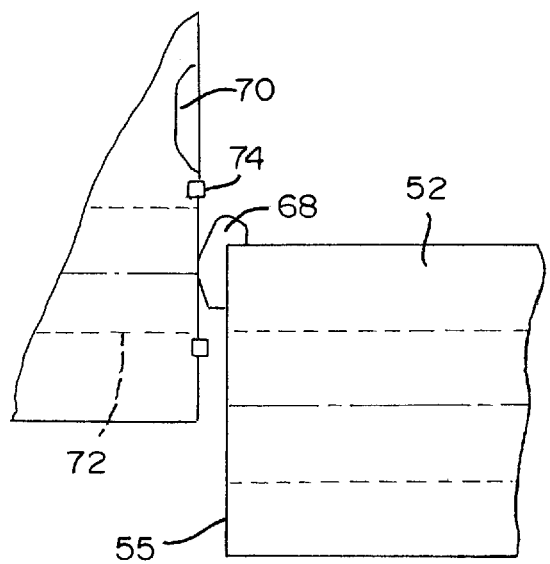
FIGS. 11 and 12 depict in sequence the installation of a filter vessel into sealing engagement with the pipe spool of FIG. 10.
Figure 12:
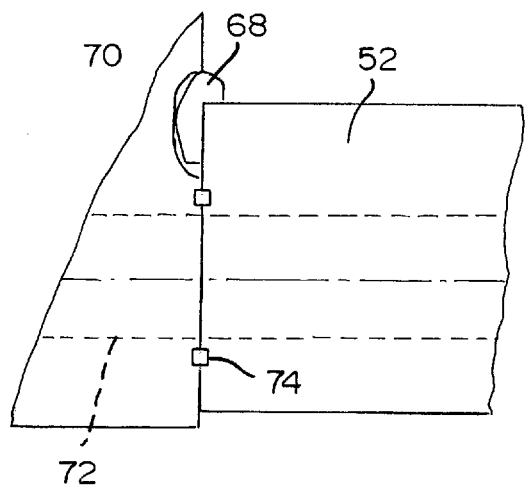

Referring now to FIGS. 10–15, another aspect of the present invention is depicted by which the reinstallation of a cleaned and/or repaired filter vessel 29 into its filter sleeve or jacket 31 can be accomplished with substantially minimized risk of damaging the port seal on the filter vessel which is to be mated with the pipe spool extending from the diverter valve assembly. FIGS. 10–12 depict one preferred embodiment of the means for protecting the port seal on the filter vessel and FIGS. 13–15 depict another preferred embodiment of the protecting means. In each embodiment, the protecting means comprises projections extending from either the pipe spools or the filter vessel 29 which provide a barrier which is temporarily placed between the vessel and the pipe spool as the vessel is inserted into the surrounding jacket. FIG. 8 depicts in perspective view the outward end face of a typical pipe spool from a diverter valve, such as the pipe spools 52,54 associated with the diverter valve 26 in FIGS. 3,4 and 5. While only one pipe spool, pipe spool 52, is shown in FIGS. 10–12 and 14–15, it will be understood that each such pipe spool includes the features described herein. In the preferred embodiment, each pipe spool 52,54 is substantially square in cross-section with a cylindrical passageway extending longitudinally through the length of the pipe spool and opening at the end face 55 which includes outer corners 57,59. Alternately, the pipe spools 52,54 may be substantially round in cross-section and include wing-like protrusions, or the pipe spools may be of any other suitable shape which provides a temporary barrier between the vessel and the pipe spool as the vessel is inserted into the jacket.

In accordance with the embodiment of the present invention shown in FIGS. 10–12, the end face 55 of each pipe spool 52 or 54 is fitted with a pair of seal protector lugs 68 at two corners 57,59 of the end face so as to be spaced from one another by a distance greater than the diameter of the passageway in the pipe spool 52 or 54 (which corresponds in diameter to the mating seal about the inlet port of the associated filter vessel). As will thus be understood with reference to the schematic illustrations of FIGS. 11 and 12, after an out-of-service filter vessel has been cleaned and/or repaired, the reinstallation of the filter vessel into its surrounding jacket may be more readily accomplished with minimized risk of damaging the seal 74 on the vessel's inlet port 72 because, during reinsertion of the vessel into the jacket, any contact between the vessel and the projecting pipe spool 52 or 54 will be most likely to occur with the protector lugs 68 on the end face 55 of the pipe spool 52 or 54. By virtue of the thickness of the seal protector lugs 68 and their lateral spacing, the lugs 68 maintain a sufficient spacing between the surface of the vessel and the end face 55 of the pipe spool to minimize any risk of contact by the seal 74 with the pipe spool and, likewise, the lugs 68 themselves are unlikely to contact the seal but rather the seal will pass between the lugs as the filter vessel is fully inserted into the surrounding jacket. Upon proper positioning of the filter vessel within the jacket, the lugs 68 seat in mated recesses 70 in the surface of the vessel adjacent the inlet port 72 and the annular seal 74 thereabout, while simultaneously the seal 74 presses against the end face 55 of the pipe spool upon the alignment of the inlet port 72 and the passageway of the pipe spool 52 or 54.

FIGS. 13–15 depict another preferred embodiment of the means for protecting the port seal 74 on the filter vessel. FIG. 13 depicts in perspective view the face of a filter vessel including the vessel's inlet port 72 and the seal 74, and a pair of seal protector lugs 68 mounted on either side of the inlet port. As shown in FIGS. 14 and 15, the outer corners 57,59 of the pipe spool 52 or 54 include notches or chamfers 63. The seal protector lugs 68 are positioned on the filter vessel so as to be spaced from one another by a distance greater than the diameter of the cylindrical passageway in the pipe spool 52 or 54 (which corresponds in diameter to the mating seal about the inlet port of the associated filter vessel). As in the embodiment shown in FIGS. 11 and 12, the schematic illustrations of FIGS. 14 and 15 show that the protector lugs 68 on the filter vessel also prevent contact with the seal 74 while the filter vessel is being reinstalled into the jacket so that the risk of damaging seal 74 is minimized during the process. As shown in FIG. 15, upon proper positioning, the lugs 68 are seated adjacent to the notch 63 of the pipe spool while the seal 74 is simultaneously seated in the port in the end face of the pipe spool.

Referring now to FIGS. 3, 4, 5 and 16, the preferred embodiment of the invention may also include a system support frame 80 which includes a bolt sealing assembly 82 which pushes off the frame to urge the filter vessel into sealed relation with the pipe spools 52, 54 instead of pushing off the filter vessel itself. The system support frame 80 of the present invention is designed to support the filter vessels and provide the bolt sealing assembly while allowing the filter vessels to be readily removed and reinserted. As shown in FIGS. 4 and 5, the system support frame 80 includes a plurality of vertical support members 84 and horizontal support members which are arranged in a skeletal fashion to support the jackets surrounding the filter vessels therein. The vertical support members 84 include a top portion 88 and a bottom portion 90. In the preferred embodiment, the frame 80 has a substantially rectangular shape and includes four vertical support members 84 at each corner of the rectangle and two side horizontal members 85 extending from the top portion 88 of one vertical member to the top portion of another vertical member to define each side of the rectangular frame, and includes two end horizontal members 86 extending from the top portion of one vertical member to another vertical member to define each end of the rectangular frame. To provide further support, the frame may include two side horizontal members extending from the bottom portion 90 of one vertical member to another on each side of the frame and two end horizontal members extending from the bottom portion of one vertical member to another on each end of the frame 80.

Figure 6:
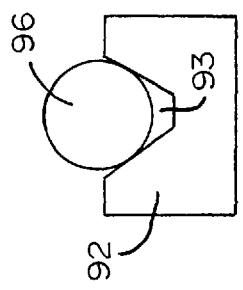
FIG. 6 is an enlarged end view of the holder in the system support frame and the valve plate showing the v-shaped groove.

As best seen in FIG. 3, the end horizontal members 86 at the top of the frame 80 are positioned adjacent to each filter vessel and each includes a holder 92 having a channel or groove 93 (see FIG. 6). As shown in FIGS. 4 and 5, the holder 92 adjacent to the inside of each filter vessel is formed by a valve plate 91 which is connected to each diverter valve assembly 26 and extends vertically adjacent to each filtration unit 25,27. The channel or groove 93 is also included in a top end 95 of the valve plate 91. As shown in FIGS. 3, 4 and 5, the vessel lid 61 includes a pair of blocks 94 which extend upward from the lid and each include a post or trunnion 96 which projects laterally outwardly from the lid 61 and is adapted to be seated in the channel 93 of the holder 92 adjacent to the outside of each filtration unit 25,27 and in the channel 93 of each valve plate 91 adjacent to the inside of each filtration unit 25,27 when the filter vessels are properly positioned to suspend the filter vessels in the system support frame 80.

Figure 18:
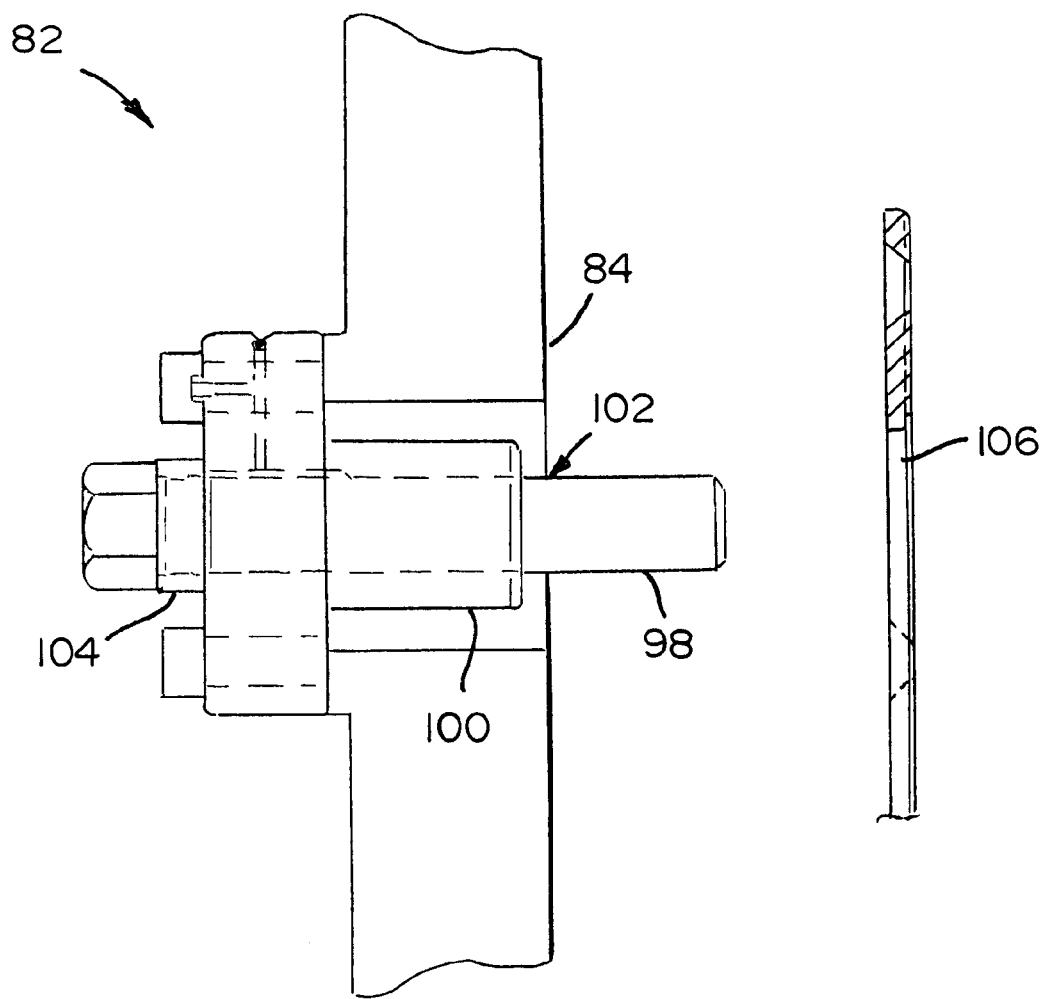
FIG. 18 is an enlarged side view of the sealing bolt assembly inserted into the frame and the wear plate which is mounted on the filter vessel.

The prior art polymer processing system of FIG. 2 shows two typical sealing bolt arrangements on each filter vessel which each include a bolt housing 81 in the sleeve or jacket supporting the filter vessel and a bolt which is inserted into the bolt housing and presses directly against the filter vessel. Because the bolt arrangement is supported by the heat exchanger or jacket of the vessel, the forces generated by the opposite reaction when the bolt presses against the filter vessel are exerted directly on the jacket, thereby placing the jacket under a large amount of stress. In contrast, the bolt sealing assembly 82 of the present invention is mounted on the frame 80 so that the frame, and not the filter vessel heat exchanger or jacket, is subjected to any stress associated with urging the filter vessel in the direction of the diverter valve 26 for sealing engagement with the pipe spools 52, 54 that extend from the diverter valve 26. As shown in FIGS. 4 and 5, the bolt sealing assembly 82 is mounted near the top portion 88 and near the bottom portion 90 of the vertical support members 84 positioned opposite from the inlet port of each filter vessel. As best seen in FIG. 18, the bolt assembly includes a bolt 98, a bolt body 100 adapted to be mounted in the frame and having a through hole 102 for threadably receiving the bolt, and a bushing 104 for limiting the extent to which the bolt can be inserted into the body 100 and extend therethrough to press against the filter vessel. The jacket 31 includes a through hole adjacent to each bolt assembly and the bolt passes through the hole and presses against the filter vessel. Thus, the opposite reaction generated when the bolt presses against the filter vessel exerts force on the frame 80 instead of the jacket to avoid placing stress on the jacket. To prevent the bolt from wearing a hole at the point of contact with the filter vessel, the preferred embodiment also includes a wear plate 106 (see FIG. 18) which is mounted to the filter vessel for contact with the bolt.

It will therefore be readily understood by those persons skilled in the art that the present invention is susceptible of a broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for the purpose of providing a full and enabling disclosure of the invention. The foregoing disclosure is not intended or to be construed to limit the present invention or otherwise to exclude any such other embodiments, adaptations, variations, modifications and equivalent arrangements.

What is claimed is:

1. An improved polymer processing system of the type having two polymer filtration units coupled to at least one diverter valve arrangement having two diverter ports, each port in communication with a connecting pipe for carrying polymer to or from the filtration units and for selectively diverting molten polymer through the connecting pipe alternately into and through the filtration units, the improvement comprising means for positioning the filtration units on opposite sides of the diverter valve assembly for connection of the filtration units to the diverter valve assembly whereby the length of the connecting pipes may be minimized, wherein the filtration unit includes a top lid having a body and the improvement further comprises a vent valve arrangement within the body of the lid.

2. The improved polymer processing system of claim 1, wherein said means comprises an improved manifold adapted to position said diverting ports at opposite sides of the manifold.

3. The improved polymer processing system of claim 1, the improvement further comprising means for draining of fluid from an inactive filtration unit.

4. An improved polymer processing system of the type having two polymer filtration units coupled to at least one diverter valve arrangement having two diverter ports, each port in communication with a connecting pipe for carrying polymer to or from the filtration units and for selectively diverting molten polymer through the connecting pipe alternately into and through the filtration units, the improvement comprising means for positioning the filtration units on opposite sides of the diverter valve assembly for connection of the filtration units to the diverter valve assembly whereby the length of the connecting pipes may be minimized, the improvement further comprising means for draining of fluid from an inactive filtration unit, wherein the diverter valve includes said means for draining of fluid and said means for draining of fluid is adapted to automatically provide communication with an inactive filtration unit for introducing gas therein only when the flow of polymer has been diverted from the filtration unit and the filtration unit is inactive.

5. An improved polymer processing system of the type having two polymer filtration units coupled to at least one diverter valve arrangement having two diverter ports, each port in communication with a connecting pipe for carrying polymer to or from the filtration units and for selectively diverting molten polymer through the connecting pipe alternately into and through the filtration units, the improvement comprising means for positioning the filtration units on opposite sides of the diverter valve assembly for connection of the filtration units to the diverter valve assembly whereby the length of the connecting pipes may be minimized, wherein the filtration unit includes an inlet port having a seal and the improvement further comprises means for protecting the seal during removal and reinstallation of the filtration unit.

6. The improved polymer processing system of claim 1, the improvement further comprising means for urging the filtration unit into sealing engagement with the connecting pipe without placing stress on the filtration unit.

7. An improved polymer processing system of the type having two polymer filtration units coupled to at least one diverter valve arrangement having two diverter ports, each port in communication with a connecting pipe for carrying polymer to or from the filtration units and for selectively diverting molten polymer through the connecting pipe alternately into and through the filtration units, the improvement comprising means for positioning the filtration units on opposite sides of the diverter valve assembly for connection of the filtration units to the diverter valve assembly whereby the length of the connecting pipes may be minimized, wherein said means for positioning the filtration units on opposite sides of the diverter valve arrangement is an improved diverter valve arrangement, said improved diverter valve arrangement including a manifold block having an outward face, opposite side faces and a sealing face, and including passageways having inlet ports for receiving incoming fluid flow and outlet ports for discharging outgoing fluid flow through said passageways, a slide plate having a sealing face adapted to be in sealing surface engagement with said manifold block sealing face and including a fluid flow passageway at said sealing face of said slide plate for controlling communication between said passageways of said manifold block, a backing plate, said slide plate being sandwiched between said backing plate and said manifold block with the respective said sealing faces of the manifold block and said slide plate in facing relation, means for clamping said manifold block and said backing plate together to urge the respective sealing faces of said manifold block and said slide plate into sealing engagement while permitting sliding movement of the slide plate for selective communication between said inlet and outlet fluid flow passageways of said manifold block, the improvement comprising an angular configuration and arrangement of said passageways wherein said inlet ports are at the sealing face of the manifold block and the outlet port of one passageway is at one side face and the outlet port of another passageway is at the opposite side face.

8. The improved polymer processing system of claim 7, the improvement further comprising means for draining of fluid from an inactive filtration unit, said means comprising a pair of spaced-apart first channels extending through said backing plate and a pair of spaced-apart second channels extending through said sliding plate and alternately in communication with one inlet port via the sliding movement of said slide plate, wherein one first channel is adapted to be placed in vertical alignment with one second channel only when said second channel is in communication with one inlet port.

9. The improved polymer processing system of claim 8, wherein each first channel comprises an upper gas purge port and each second channel comprises a lower gas purge port, said upper and lower gas purge ports for introducing gas into an inactive filtration unit only when said upper and lower gas purge ports are in vertical alignment.

10. An improved polymer processing system of the type having two polymer filtration units coupled to at least one diverter valve arrangement having two diverter ports, each port in communication with a connecting pipe for carrying polymer to or from the filtration units and for selectively diverting molten polymer through the connecting pipe alternately into and through the filtration units, the improvement comprising means for positioning the filtration units on opposite sides of the diverter valve assembly for connection of the filtration units to the diverter valve assembly whereby the length of the connecting pipes may be minimized, wherein the filtration unit includes a top lid having a body and the improvement further comprises a vent valve arrangement within the body of the lid, wherein the lid includes a port extending laterally outwardly through the body of the lid.

11. An improved polymer processing system of the type having two polymer filtration units coupled to at least one diverter valve arrangement having two diverter ports, each port in communication with a connecting pipe for carrying polymer to or from the filtration units and for selectively diverting molten polymer through the connecting pipe alternately into and through the filtration units the, improvement comprising means for positioning the filtration units on opposite sides of the diverter valve assembly for connection of the filtration units to the diverter valve assembly whereby the length of the connecting pipes may be minimized, wherein each filtration unit comprises a filter vessel surrounded by a jacket and a pipe spool extending from the diverter valve arrangement into the jacket, said pipe spool including an end face having an opening and being adapted to engage the inlet port of the filtration unit for connecting the filtration unit to the diverter valve arrangement, said means comprising a projection extending from either the filter vessel or the pipe spool for providing a temporary barrier between the filter vessel and the end face of the pipe spool while the filter vessel is removed from or inserted into the surrounding jacket.

12. The improved polymer processing system of claim 11, wherein said piping spool is substantially square in cross section and said end face includes outer corners and a pair of lugs mounted at said outer corners of said end face.

13. The improved polymer processing system of claim 12, wherein the filter vessel includes recesses adjacent to the inlet port for receiving said lugs of said end face.

14. The improved polymer processing system of claim 11, the filter vessel includes a pair of lugs mounted on opposite sides of the inlet port and positioned a predetermined spaced-apart distance from one another.

15. The improved polymer processing system of claim 14, wherein said piping spool is substantially square in cross section and said end face includes outer corners, said outer corners including notches.

16. An improved polymer processing system of the type having two polymer filtration units coupled to at least one diverter valve arrangement having two diverter ports, each port in communication with a connecting pipe for carrying polymer to or from the filtration units and for selectively diverting molten polymer through the connecting pipe alternately into and through the filtration units, the improvement comprising means for positioning the filtration units on opposite sides of the diverter valve assembly for connection of the filtration units to the diverter valve assembly whereby the length of the connecting pipes may be minimized, the improvement further comprising means for supporting said filtration units.

17. The improved polymer processing system of claim 16, said support means comprising a system support frame including a plurality of vertical support members and horizontal support members positioned to support the filter vessels in suspension.

18. The improved polymer processing system of claim 17, wherein each filter vessel includes a top lid having a pair of blocks extending upward therefrom and each block includes a post projecting laterally outwardly from said lid and wherein one horizontal support member is positioned adjacent to one side of each filter vessel and includes a means for receiving said post and releasably holding the filter vessel in suspension.

19. The improved polymer processing system of claim 18, wherein said means comprises a holder adjacent to each side of the filter vessel, said holder having a groove adapted to receive said post.

20. The improved polymer processing system of claim 17, wherein filtration unit comprises a filter vessel surrounded by a jacket and a pipe spool extending from the diverter valve assembly into the jacket, said pipe spool adapted for engagement with the inlet port of the filtration unit for connecting the filtration unit to the diverter valve assembly, said support system including means for urging the filter vessel into sealing engagement with the pipe spool without placing stress on the jacket.

21. The improved polymer processing system of claim 20, said means comprising a bolt assembly mounted to said system support frame and being adapted to urge said filter vessel into sealing engagement with said pipe spool.

22. The improved polymer processing system of claim 21, wherein one of said vertical members is positioned adjacent to one side of the filter vessels opposite from the other side including the inlet port and said bolt assembly comprises a bolt body mounted in said vertical member and having a through hole, a bolt for insertion into the through hole and means for limiting the movement of the bolt in the through hole whereby said inserted bolt extends through the through hole to a predetermined distance outward from the vertical member.

23. The improved polymer processing system of claim 22, wherein said sealing means further comprises a wear plate adapted to be mounted on said filter vessel for contact with said bolt to prevent wearing of the filter vessel due to contact with the bolt.

24. An improved diverter valve assembly of the type comprising a manifold block having an outward face, opposite side faces and a sealing face, and including passageways having inlet ports for receiving incoming fluid flow and outlet ports for discharging outgoing fluid flow through said passageways, a slide plate having a sealing face adapted to be in sealing surface engagement with said manifold block sealing face and including a fluid flow passageway at said sealing face of said slide plate for controlling communication between said passageways of said manifold block, a backing plate, said slide plate being sandwiched between said backing plate and said manifold block with the respective said sealing faces of the manifold block and said slide plate in facing relation, means for clamping said manifold block and backing plate together to urge the respective sealing faces of said manifold block and said slide plate into sealing engagement while permitting sliding movement of the slide plate for selective communication between said inlet and outlet fluid flow passageways of said manifold block, the improvement comprising means for positioning a pair of filtration units coupled to the diverter valve on opposite sides of said manifold block, said means comprising a series of passageways in said manifold block, said manifold block having an angular configuration and arrangement of said passageways wherein said inlet ports are at the sealing face of the manifold block and the outlet port of one passageway is at one side face and the outlet port of another passageway is at the opposite side face.

25. The improved diverter valve assembly of claim 24, said passageways comprising:

a central passageway extending linearly through said manifold block from its inlet port at said outward face to its outlet port at said sealing face;

a first end passageway extending angularly from its inlet port at said sealing face to open at its outlet port at said one side face of said manifold block; and a second end passageway extending angularly from its inlet port at said sealing face to open at its outlet port at said opposite side face of said manifold block.

26. The improved diverter valve assembly of claim 25, the improvement further comprising means for injecting gas into an inactive filter vessel.

27. The improved diverter valve assembly of claim 26, said means comprising an upper gas purge port and a lower gas purge port, said upper and lower gas purge ports being in vertical alignment for introducing gas into the filter vessel only when the filter vessel is inactive.

* * * * *